Jan. 1, 1963   E. L. SCHEIDENHELM   3,071,196
TOMATO HARVESTER
Filed Jan. 23, 1961   8 Sheets-Sheet 1
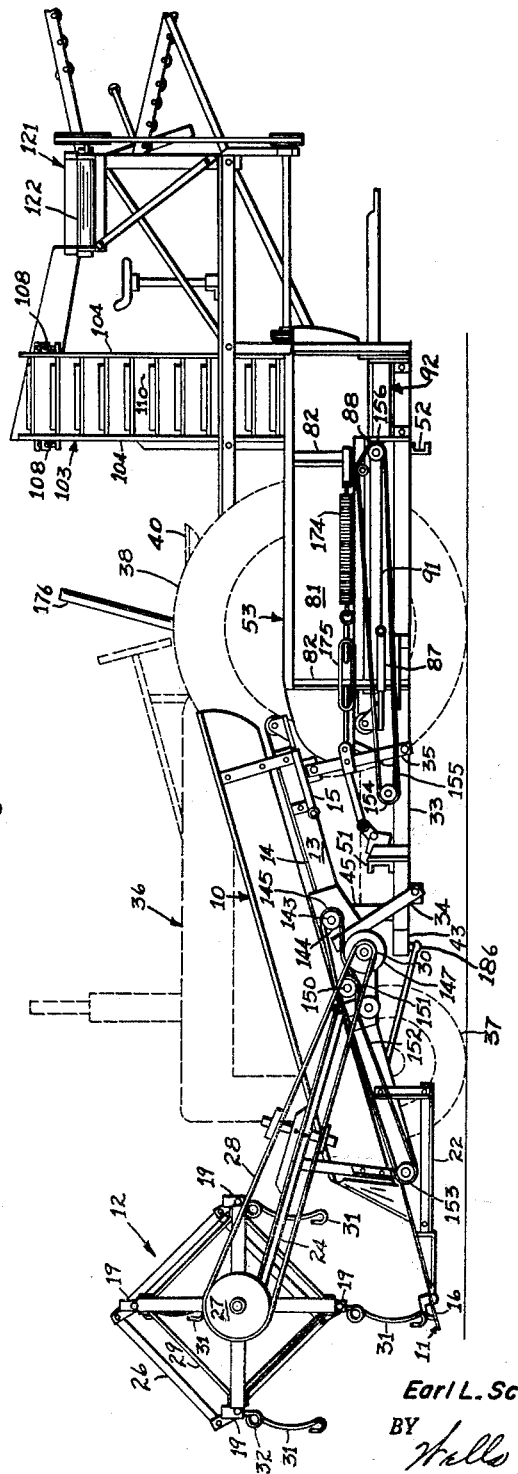
Fig. I
INVENTOR.
Earl L. Scheidenhelm
BY Wells & St. John
Attys.

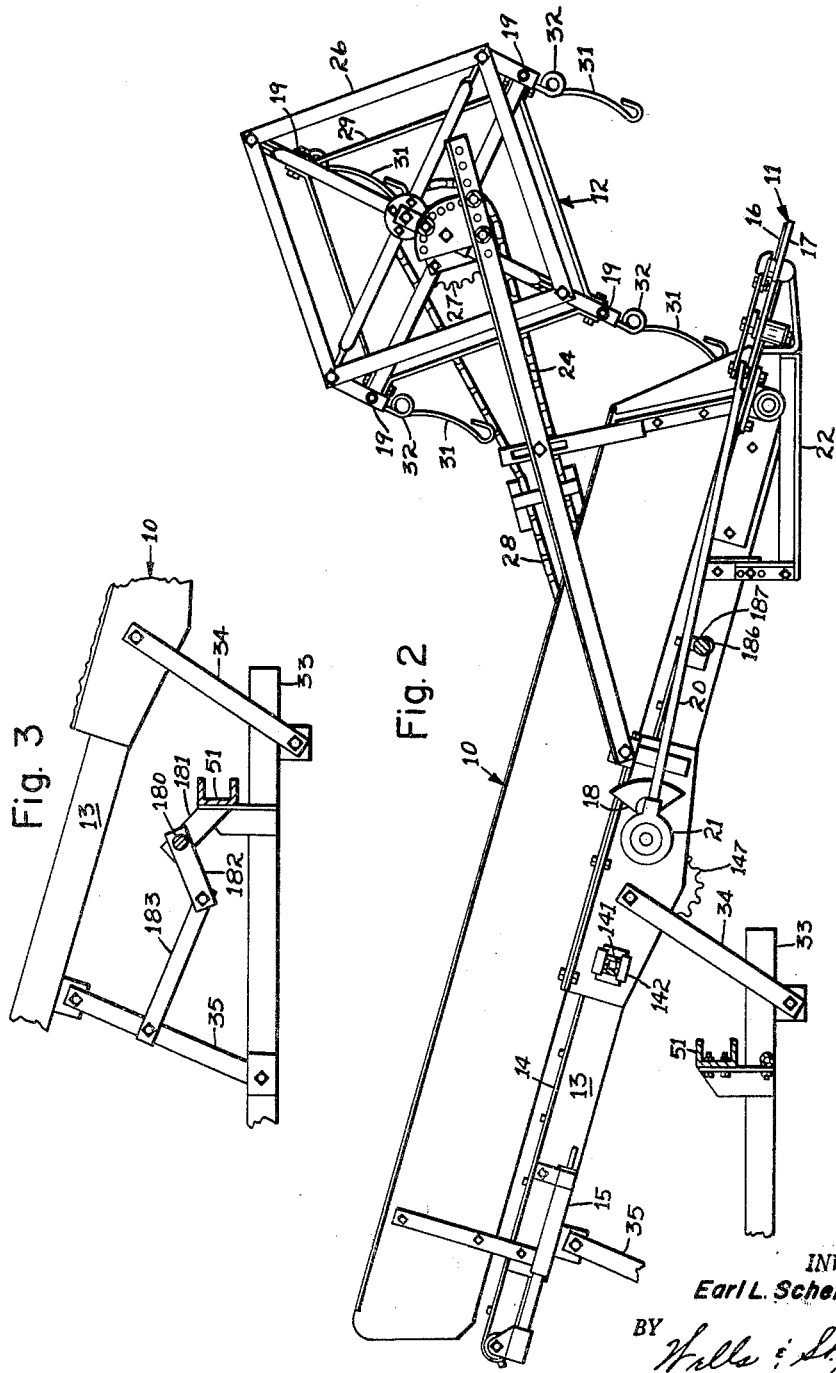

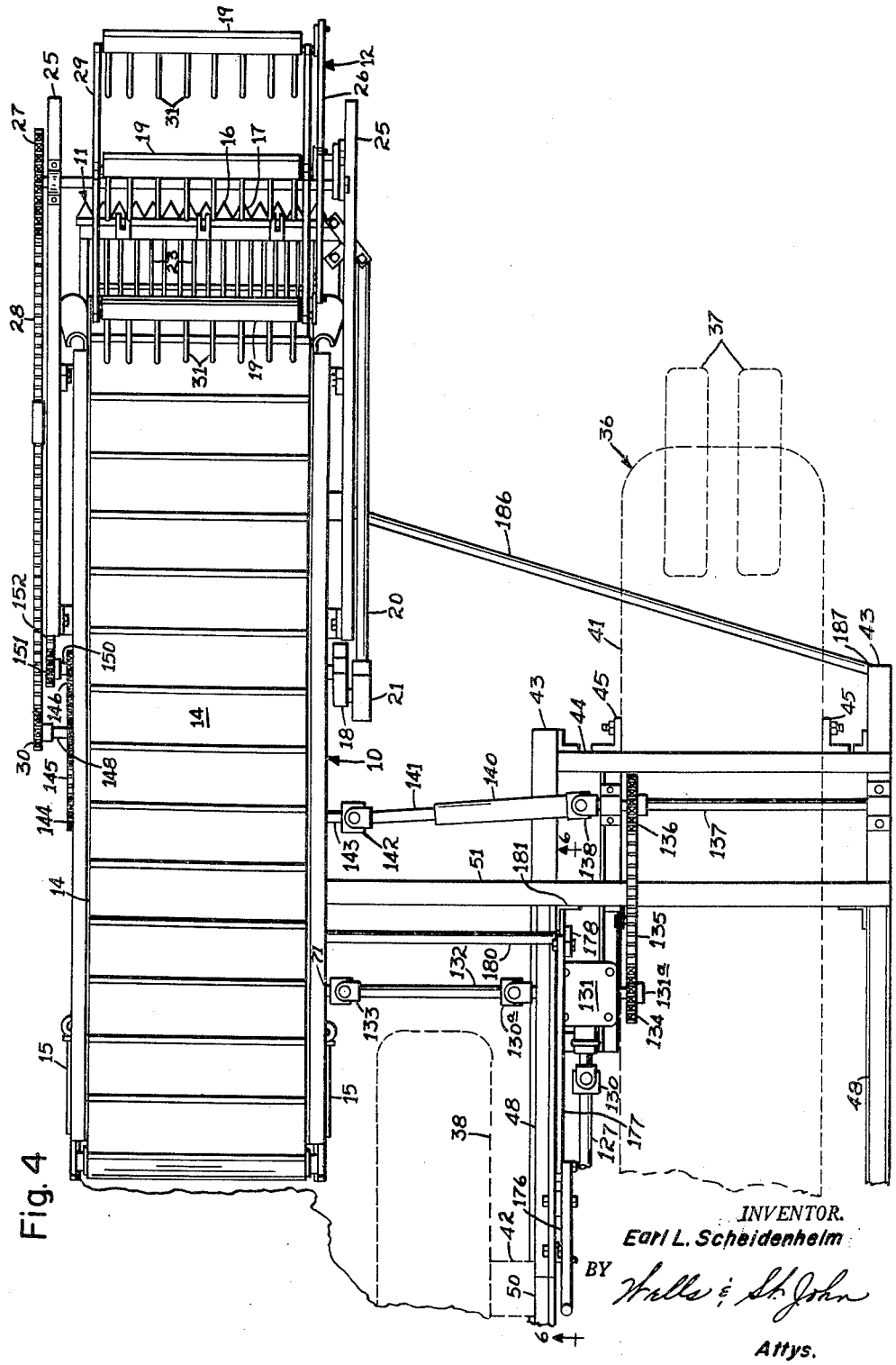

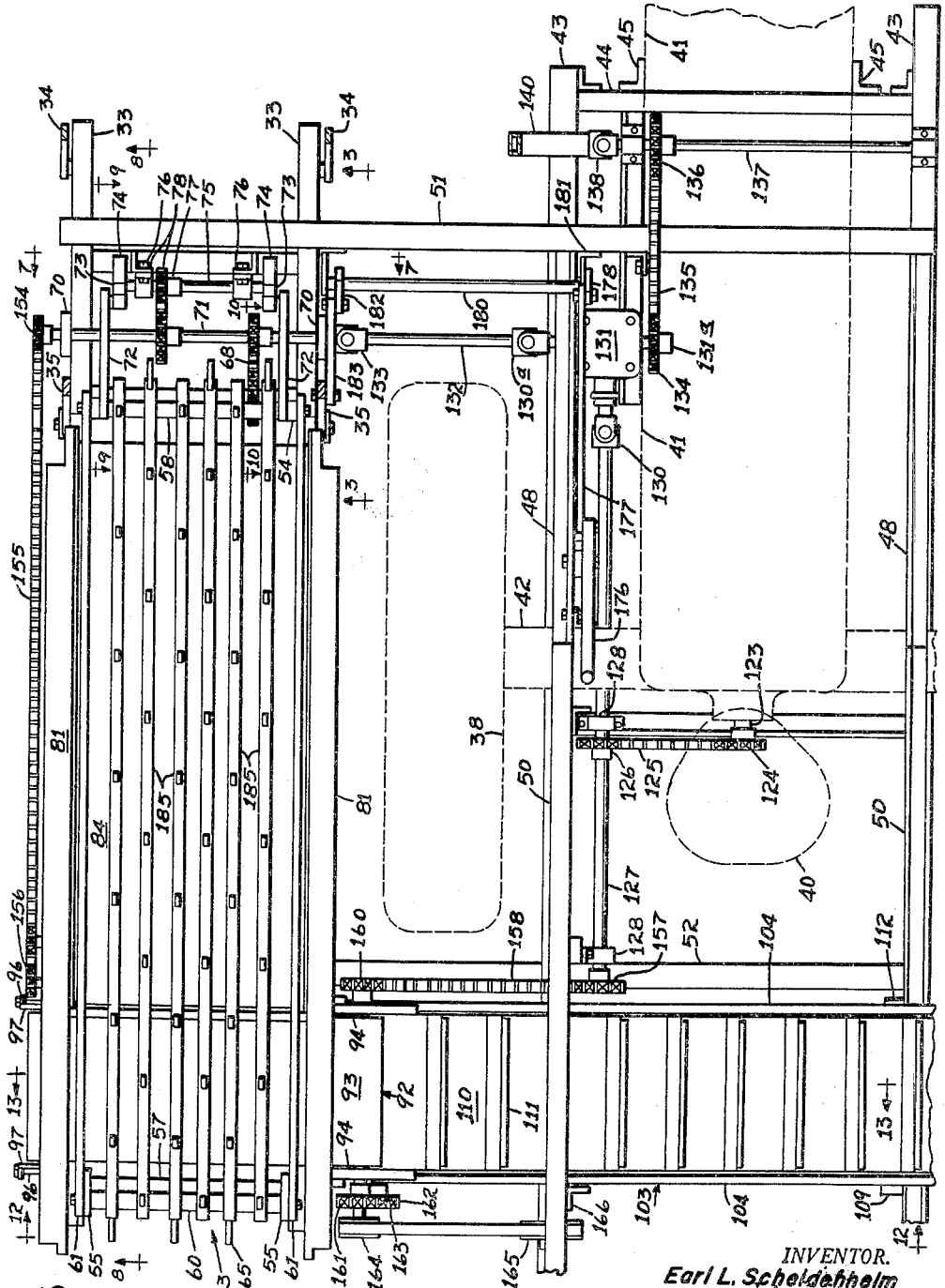

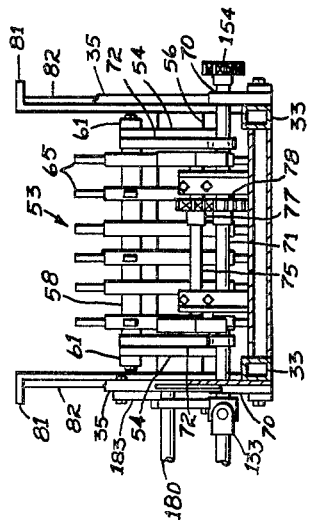
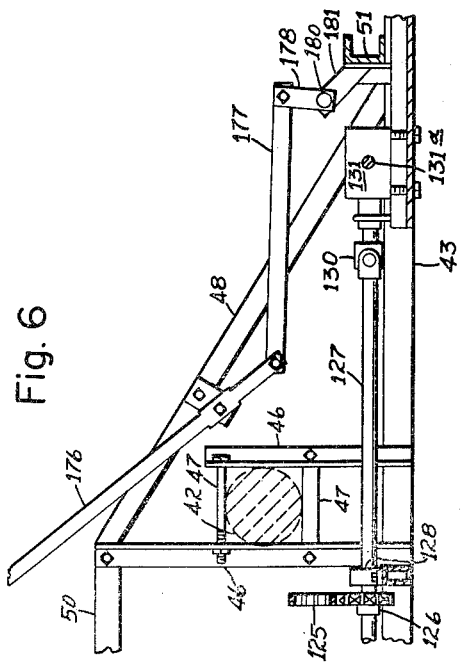
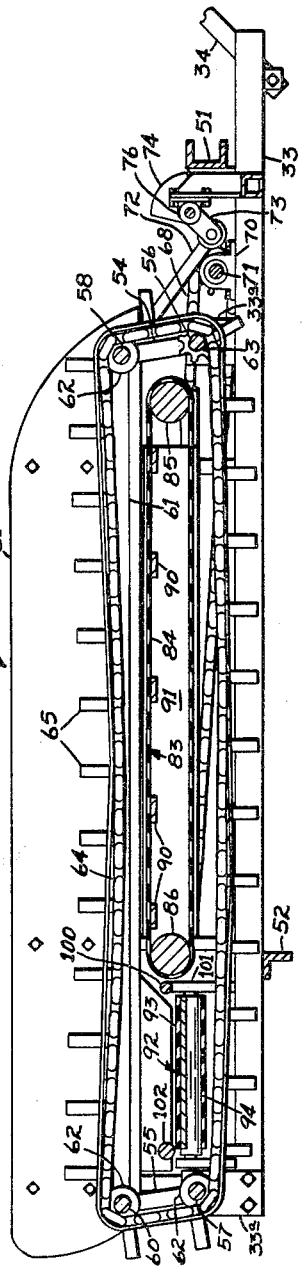

Jan. 1, 1963 E. L. SCHEIDENHELM 3,071,196
TOMATO HARVESTER
Filed Jan. 23, 1961 8 Sheets-Sheet 6
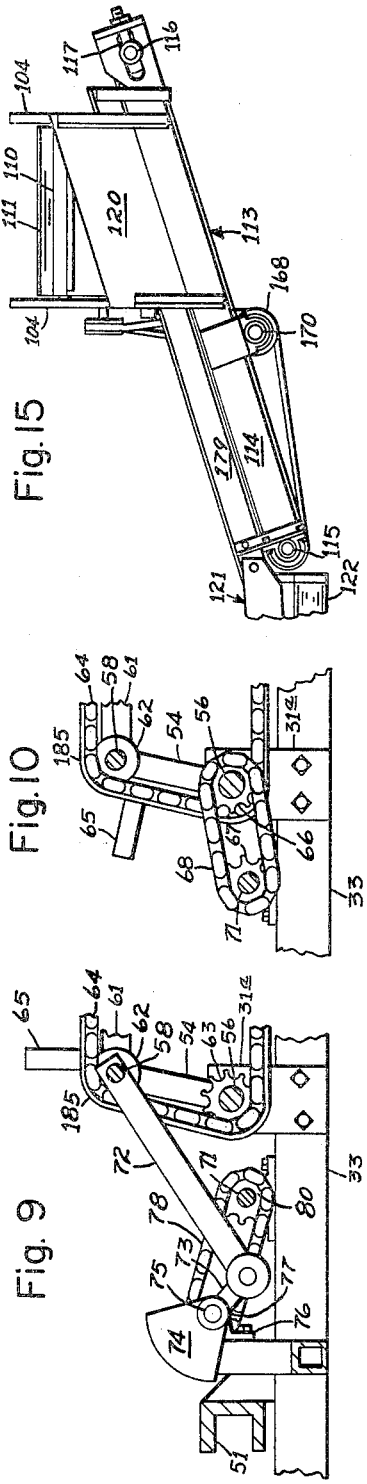
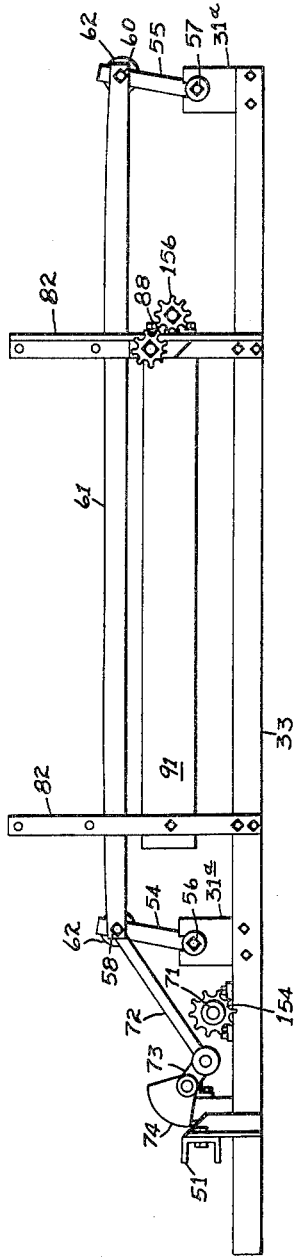
INVENTOR.
*Earl L. Scheidenhelm*
BY
*Wells & St. John*
Attys.

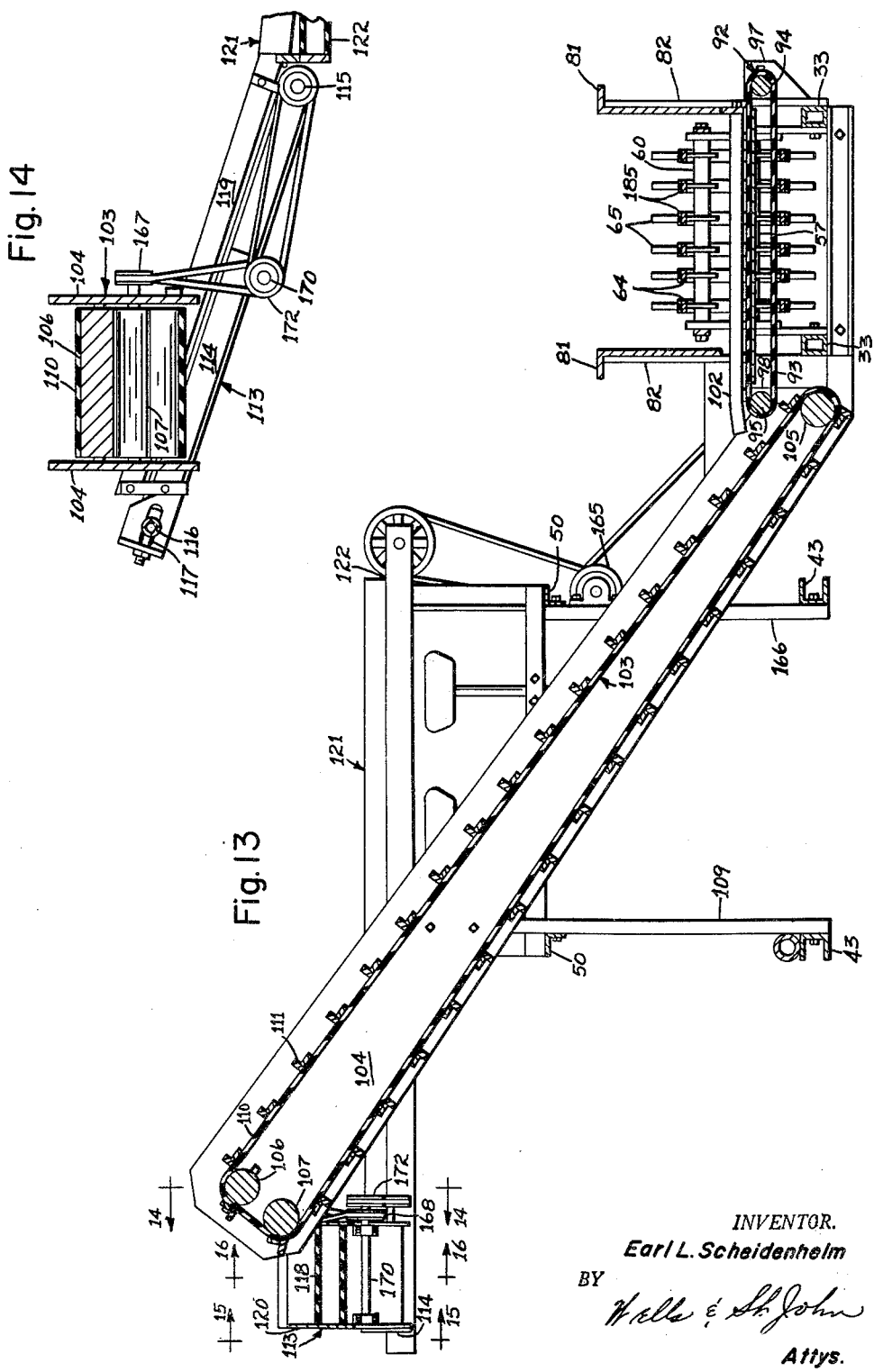

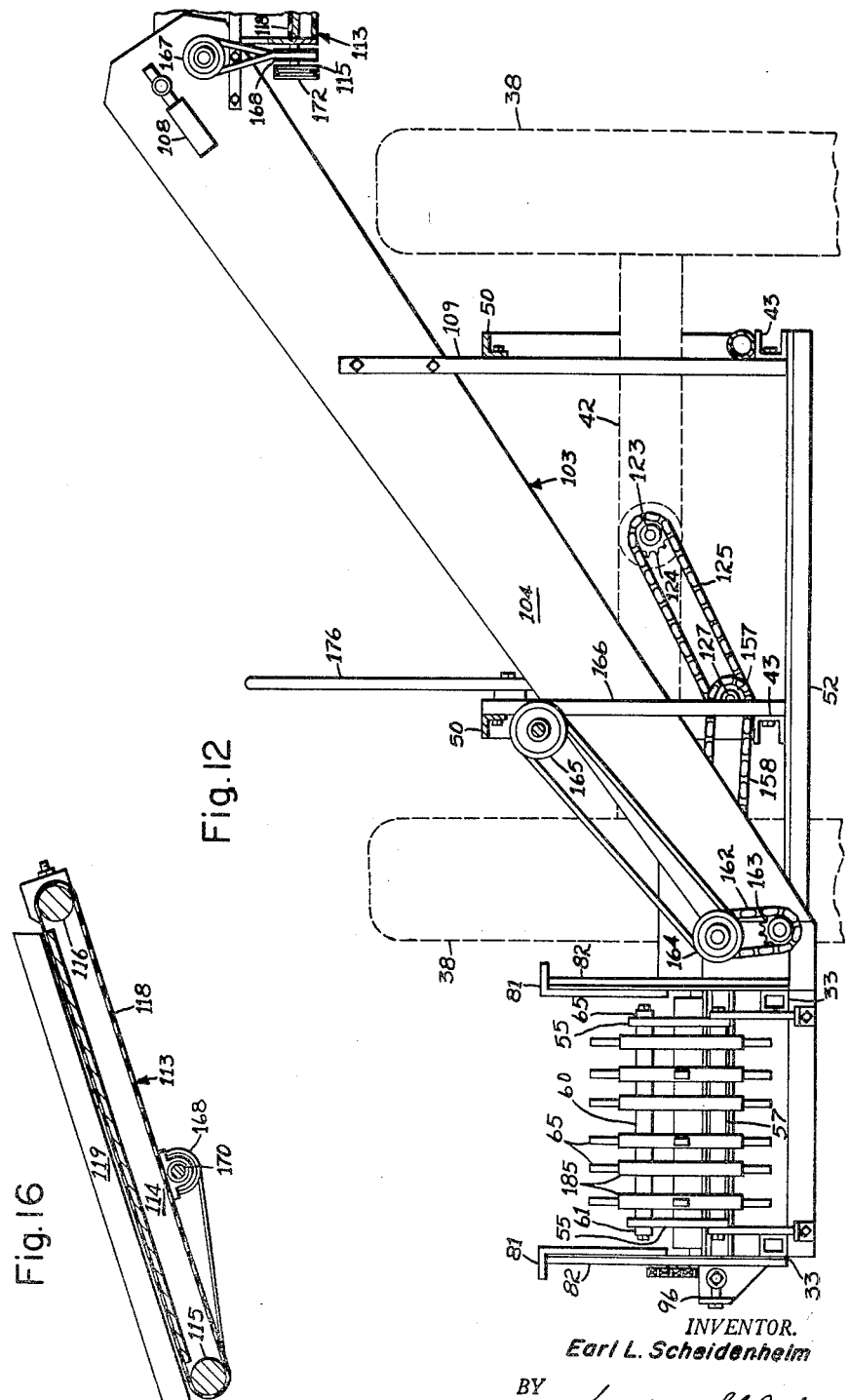

United States Patent Office 3,071,196
Patented Jan. 1, 1963

3,071,196
TOMATO HARVESTER
Earl L. Scheidenhelm, Mendota, Ill., assignor to
Horace D. Hume, Mendota, Ill.
Filed Jan. 23, 1961, Ser. No. 84,200
7 Claims. (Cl. 171—62)

This invention relates to a novel tomato harvester.

The present invention is concerned with the design of a tomato harvester adapted to be carried on a mobile frame by a conventional farm tractor. Until the present time, the harvesting of tomatoes has been carried out by manual means. All handling of the tomatoes for sorting or grading purposes was carried out at central stations normally located at canneries. The delicate nature of the tomato, as compared with other vegetables and fruits which are mechanically harvested, has made it seem impossible to develop a mechanical harvester which could be used effectively in the field. In addition, the tendency of tomatoes to bear fruit over an extended season made mechanical harvesting a difficult task. In recent years tomatoes have been developed which mature on a vine at a single stage and which have relatively tough skins when the tomatoes are ripe. It is with this type of tomato that the present invention is particularly concerned. The tomatoes are harvested by cutting the vines and removing the fruit from the harvested vines. All harvesting, cleaning and sorting operations are carried out on a single mobile frame which is transported through the fields on a common farm tractor.

It is a first object of this invention to provide a tomato harvester which is adapted for use on a conventional tractor. In order to fulfill this object it is necessary to design a compact and well balanced frame which can be securely attached to a tractor for easy maneuverability through a tomato field. In carrying out this object it has been found best to mount the cutting assemblies at one side of the tractor and to drive the tractor down the side of the row. The separator assembly for removing the tomatoes from the vines is mounted longitudinally alongside the tractor and the tomatoes are carried from this assembly to an elevated position by a transverse conveyor. The tomatoes are finally cleaned by a cleaning conveyor which discharges them to a sorting platform on which they are manually sorted and boxed for later preparation. The entire frame is quite compact and the machinery can easily be managed by a single tractor operator and the required sorters.

It is another object of this invention to provide a harvesting machine for tomato vines having cutter blades positioned thereon to cut the vines below the ground surface and thereby eliminate any damage to low hanging tomatoes. This is necessitated by the facts that tomato vines are often quite heavy and that the fruit often is resting partially on the ground surface. Thus a cutter bar adapted to cut the vines below the ground surface was found to be necessary. In connection with this object it is also necessary to yieldably mount the cutter bar assembly on the fixed frame to allow vertical upward movement of the cutter bar assembly should it strike an obstruction in the ground. This is accomplished according to the present invention by the use of a trapezoidal supporting frame which will impart upward movement to the cutter bar assembly at any time that rearward force is applied thereto.

It is another object of this invention to provide a separator assembly which can effectively remove tomatoes from tomato vines without damaging the fruit. The tomatoes are ripe when harvested and can stand a minimal amount of shock. However, more than a minimum amount of shock will result in bruising or damaging the skins of the fruit. According to the present invention the separating assembly combines longitudinal conveyor movement with an oscillating action which shakes the fruit from the vines and allows them to fall from the separator conveyors to a delivery conveyor adapted to carry the fruit. This arrangement automatically disposes of the vines and separates the fruit therefrom. For protection of the fruit, the present invention relies upon rubber capped conveyors and minimizes the falling motion of the tomatoes from the oscillating conveyors to the delivery conveyors. This latter fact is accomplished by placing the tomato receiving conveyor within the confines of the oscillating separating conveyors.

It is another object of this invention to elevate the fruit removed from the vines and the separator and to allow this fruit to roll downward on a cleaning conveyor which has an upward motion and a surface adapted to clean the fruit as it slides over the conveyor. This conveyor serves a second purpose by guiding the fruit to the sorting platforms. It is a final object of this invention to produce a complete harvesting unit by mounting a sorting and box handling apparatus at the rear of the mobile frame and by interrelating the function of this apparatus to the harvesting function. Thus a complete harvesting machine is provided, requiring only one tractor operator and one or two sorters, plus one or two persons on the trailing vehicle which supplies and removes boxes from the sorting area.

These objects, and further objects, will not be more evident from a study of the following description of one preferred embodiment of my invention. It is to be understood at the offset that the embodiment is merely exemplary of many forms which could be devised to accomplish the same desired results. Since many mechanical expedients could be substituted in place of the particular structure shown, the following description is not to limit my invention except as it is defined in the claims which follow it.

In the drawings:

FIGURE 1 is a side view of the complete harvester as mounted on a tractor shown in dashed lines;

FIGURE 2 is a side view of the front conveyor and harvesting assembly as seen from the side opposite to that shown in FIGURE 1, and detached from the tractor;

FIGURE 3 is a fragmentary view taken somewhat to the left of FIGURE 2 showing the support linkage for the front conveyor and harvesting assembly;

FIGURE 4 is a top view of the forward portion of the harvester with the tractor again shown by dashed lines and with the portion of the harvester rearward of the front conveyor and harvesting assembly being broken away;

FIGURE 5 is another top view of the harvester showing the separator assembly, the elevating conveyor and the adjoining framework, the tractor being shown in outline by dashed lines;

FIGURE 6 is a sectional view taken along line 6—6 in FIGURE 4 with the adjoining structure broken away and with the background structure not shown;

FIGURE 7 is a sectional view taken along line 7—7 in FIGURE 5;

FIGURE 8 is a longitudinal sectional view taken along the vertical line 8—8 in FIGURE 5;

FIGURE 9 is an enlarged sectional view taken along line 9—9 in FIGURE 5 showing the control arm assembly for the separator assembly;

FIGURE 10 is an enlarged sectional view taken along line 10—10 in FIGURE 5 showing the drive assembly for the separator conveyors;

FIGURE 11 is a side view of the separator assembly showing only the supporting framework for the assembly and adjoining conveyors with the conveyors and side plates removed for clarity;

FIGURE 12 is an end view of the harvesting machine taken along line 12—12 in FIGURE 5;

FIGURE 13 is an enlarged sectional view taken along line 13—13 in FIGURE 5;

FIGURE 14 is a sectional view taken along line 14—14 of FIGURE 13;

FIGURE 15 is a side view of the cleaning conveyor as seen along line 15—15 in FIGURE 13; and FIGURE 16 is a sectional view through line 16—16 in FIGURE 13.

General Description

The present invention contemplates a complete tomato harvester for field harvesting and sorting of tomatoes. The governing concept of the present invention is to provide a mobile harvesting unit which can be mounted on a row crop tractor and which can be used in harvesting tomatoes grown according to present farm practices. A conventional row crop tractor is utilized with a harvesting reel located to the left of the tractor. The left rear tractor tire is immediately to the right of a fruit conveyor belt loading from the reel while the front tractor wheels are on the line to the right of the cutter bar. The tractor is driven in the normal forward direction and will harvest tomatoes while circling the field in a counterclockwise direction as viewed from above. A single row of tomatoes is harvested. Since the entire tomato vine is harvested by the operation, a variety of tomatoes producing a single crop is preferable. In addition the tomatoes should be of a type having a relatively tough outer skin.

Fruit Conveyor and Harvesting Assembly

Referring now in particular to FIGURES 1–4, the forward section of this harvester comprises a fruit conveyor assembly 10 having mounted at the front end thereof a cutter bar assembly 11 and a harvesting reel assembly 12. The conveyor assembly 10 consists of a pair of parallel longitudinal members 13 which are joined by suitable transverse supports to form a rigid rectangular conveyor frame. The two members 13 support a fruit conveyor which is designated generally by the numeral 14 and which extends generally rearward alongside the tractor in an upward direction at an acute angle to the horizontal. Fruit conveyor 14 is provided with suitable lugs across its exterior surface in order to insure proper carriage of vines and fruit as cut by the cutter bar assembly 11. Tension is maintained on the fruit conveyor 14 by a common spring assembly 15 shown in a casing and mounted on each of the longitudinal members. At the lower end of the fruit conveyor assembly 10 is mounted the cutter bar assembly 11. This cutter bar assembly 11 consists of a row of stationary blades 16 and adjacent movable blades 17. The blades 17 are adapted to be moved transversely across the surfaces of the stationary blades 16 by means of a crank 18 and a pivoted connecting arm 20 which is fixed to an eccentric bearing 21. This type of cutter bar assembly used in the assembly 11 is shown in United States Patent 2,572,203, granted October 23, 1951, to Earl L. Scheidenhelm and Horace D. Hume, for "Cutter For Vine Crops." As was the case in this prior patent, the present cutter bar assembly 11 is adapted to cut below the ground surface along the crop row. Fixed to the longitudinal members 13 at the forward ends thereof are two stationary guides 22 located in horizontal planes and adapted to engage the ground surface between the rows being harvested. This ground surface at the sides of each row is generally lower than the ground about the roots of the plants and serves as a vertical guide for the cutter bar assembly 11.

Intermediate the cutter bar assembly 11 and the fruit conveyor 14 are provided a plurality of parallel longitudinal spaced rods 23 which are fixed between the two members 13 in rigid positions. These rods 23 form a grate which allows dirt and rocks to fall between them and also provides clearance for the interaction of the reel fingers.

Mounted directly above the cutter bar assembly 11 is a harvesting reel assembly 12. This assembly is mounted in fixed relation to the longitudinal members 13 by means of supports 24 and 25. The harvesting reel assembly 12 is fully disclosed in United States Patent 2,644,289, granted July 7, 1953, to Horace D. Hume, for "Harvester Reels." In general, the reel assembly 12 consists of a plurality of lateral bats 19 which are mounted between reel drums 29 and which are held in a constant angular position by an eccentric drum 26. The drums 29 are turned by a sprocket 27 driven by a chain 28 extending to a smaller sprocket 30 mounted on the assembly 10. The reel fingers 31 which are mounted on bats 19 extend in a general vertical downward position. The fingers are provided with coiled spring sections 32 which urge the fingers in a rearward direction and oppose forward movement of the lower ends of fingers 31. The lower end of the fingers 31 are looped upwardly to provide a smooth vine engaging surface. The fingers 31 are mounted on bats 19 in such a manner as to allow individual pivotal movement about the top ends of the fingers 31 in a transverse plane. This movement is necessary to protect the fragile tomato crop on the vines being harvested and to allow the fingers 31 to adapt themselves to the varying crop conditions.

The two longitudinal members 13 are supported from a pair of spaced longitudinal beams 33 by means of spaced vertical links 34 and 35. The two pairs of vertical links 34 and 35 are each pivoted at their upper ends to the longitudinal members 13 and at their lower ends to the longitudinal beams 33. The front vertical links 34 are somewhat shorter in effective length when compared to the rear vertical links 35. The spacing between links 34 and 35 is greater along the longitudinal members 13 than along the beams 33. Thus the supporting linkage is a pivoted trapezoid and will move the conveyor assembly 10 in an upward and rearward direction when pushed toward the rear of the tractor.

Harvester Framework

In many of the figures the tractor itself is shown in dashed outline form. For purposes of this description the conventional tractor may be labelled by the numeral 36. It is provided with a pair of small front wheels 37 and the large rear wheels 38. The tractor 36 has the usual seat 40 for the operator. It also has a rigid forward frame 41 and rigid rear axle housing 42.

The main frame of the harvester consists of a pair of longitudinal channels 43. The channels 43 extend along each side of the tractor from a forward location adjacent the front wheels 37 to a rear position beyond the rear of the tractor. The front ends of the channels 43 are connected by a cross member 44 which is rigidly fixed to the lower ends of two vertical angle irons 45 adapted to be bolted to the forward frame of the tractor 41. As can be seen in FIGURE 6 the intermediate areas of the channels 43 are supported from the rear axle housings 42 of tractor 36 by a pair of spaced vertical angle irons 46 and connecting members 47 which may be solid members or bolts for providing an adjustable and removable assembly. One of the angle irons 46 extends above the rear axle housing 42 and is supported by a longitudinal diagonal brace 48. Fixed to this angle iron 46 at the end of the brace 48 is a rearwardly extending brace 50. The two braces 50 extend rearwardly along the length of the channels 43 and are parallel to the channels 43.

In order to support the outboard structure, a front transverse channel 51 is rigidly secured across the top surfaces of the channel 43 and a rear transverse channel 52 is rigidly fixed across the lower surfaces of the two channels 43. Each of these channels 51 and 52 extends beyond the left hand side of the tractor and each is securely fixed to the beams 33 which complete the rigid lower horizontal frame structure.

Mounted directly below the upper end of the fruit conveyor 14 is the fruit separator assembly generally designated as 53. The fruit separator assembly 53 includes an oscillating frame which is shown in FIGURE 11. This frame includes a pair of front legs 54 and a parallel pair of rear legs 55. Each of these legs 54 or 55 is pivotally mounted by means of a pair of transverse shafts 56 and 57 respectively located between short extensions 33a fixed on the two beams 33. At the upper ends of the legs 54 and 55 are carried front and rear pivotal shafts 58 and 60 which pivotally mount a pair of longitudinal beams 61. The beams 61 are located parallel to the supporting beams 33. The beams 61 in actual practice are preferably wooden beams having enlarged central vertical areas for added strength. Thus the framework for the separator assembly 53 consists of two vertical parallelogram linkages mounted in side by side parallel relation. The shafts 57, 58 and 60 have formed thereon a plurality of spaced disks 62. The shafts 57, 58 and 60 are idly mounted by the supporting frame. Thus the disks 62 are idle. The lower front shaft 56 is also idly supported between the beams 33 and has fixed thereon a plurality of spaced sprockets 63 which are located in the same vertical planes as are the disks 62.

The sprockets 63 and the disks 62 have entrained about them a plurality of link chains 64. The chains 64 constitute a plurality of spaced chain conveyors and have fixed on their outer surfaces a series of outwardly extending perpendicular lugs 65 having rounded outer ends. The lugs 65 are staggered from one chain to the next and are particularly adapted to entangle the tomato vines after they are deposited on the chains 64 by the fruit conveyor 14. The chains 64 are driven by means of the sprockets 63 which in turn are rotated about the axis of the shaft 56 by a driven sprocket 66 and a driving sprocket 67 which are connected in operative relation by a link chain 68. The driving sprocket 67 is fixed to a drive shaft 71 which is rotatably journalled by a pair of bearings 70 mounted upon the upper surfaces of the longitudinal beams 33. Thus rotation of drive shaft 71 will result in the chains 64 being driven about the locus defined by the four shafts 56, 57, 58 and 60.

In addition to the endless movement imparted by shaft 71 by chain 68, the chains 64 have imparted to them an oscillating movement about the pivotal axes of the legs 54 and 55. This pivotal movement is imparted to the parallelogram frame by a pair of pivoted crank arms 72 which are pivotally mounted at their rearward ends about the axis of the shaft 58. The forward ends of these cranks 72 are pivotally mounted on a pair of eccentric cranks 73 which include integral counterweights 74 and which are fixed to a stub shaft 75. Shaft 75 is rotatably carried by a pair of bearings 76 which are fixedly supported on the front transverse channel 51. Fixed to the shaft 75 is a driven sprocket 77. The sprocket 77 is driven by a link chain 78 entrained about a driving sprocket 80 fixed to the driving shaft 71. In this manner simultaneous oscillation of the upper flights of the chains 64 is accomplished along with the endless movement of chains 64 as conveyors.

The object of oscillating the chains 64 is to thereby shake the tomatoes from the vines entangled about the lugs 65. These tomatoes are then free to fall downward through the spaces between the chains 64. The area at each side of the separator assembly 53 is bounded by vertical side plates 81 which are supported by four vertical braces 82 fixed to the beams 33. The side plates 81 confine the tomatoes during the oscillating movement of the separator assembly 53. In order to remove the tomatoes from the vicinity of the separator assembly 53 it is first necessary to insure that each tomato is caught along the entire length of the assembly 53. For obvious reasons the tomatoes will not all be shaken off at the same time but will gradually fall as they transverse the length of chains 64. At the rear ends of chains 64 the vines are free to drop onto the ground and may be managed in any way desired.

The delivery means preferably used in this separator assembly consists of a horizontal conveyor 83 which has a smooth belt 84. The conveyor belt 84 is rotatably supported on two rollers 85, 86. The front roller 85 is rotatably mounted by a pair of spring biased bearings 87 mounted along the side beams 33. The bearings 87 are used to insure proper tension in belt 84. The rear roller 86 is rotatably mounted by a pair of bearings 88 fixed to the members 33. The upper flight of belt 84 is supported by a series of transverse straps 90 and overlapping longitudinal straps 91 which maintain this flight in its proper horizontal plane.

The belt 84 extends from the forward end of the separator assembly 53 to a cross conveyor 92 at the rear end of the assembly 53. The cross conveyor 92 is also a belt conveyor, having a belt 93. The conveyor 92 is located perpendicularly with respect to the conveyor 83. It is supported on a pair of rollers 94 and 95. The roller 94, which is at the right hand side of FIGURE 13, is rotatably mounted upon spring biased bearings 96 slidably carried on a pair of plates 97 fixed to one of the beams 33. The remaining roller 95 is rotatably mounted between a pair of short vertical angle irons 98 which are fixed to the remaining beam 33. At the rear end of the conveyor 83 is a transverse idle roller 100 extending across the width of the conveyor 83 and slightly below the upper surface of the top flight. Roller 100 is rotatably mounted between a pair of short brackets 101 extending upwardly from the two beams 33. This roller 100 facilitates the transfer of tomatoes from the fruit conveyor 83 to the perpendicular cross conveyor 92. At the rear edge of the cross conveyor belt 93 is a fixed rod 102 mounted on the rear vertical angle iron 98 adapted to prevent rearward movement of tomatoes past the rear edge of belt 93.

*Tomato Handling Assemblies*

At the delivery end of the cross conveyor 92 is provided an elevating conveyor 103. This conveyor 103 is fixed to the plate 98 and extends upwardly at a steep angle to a discharge position. The elevating conveyor is provided with a pair of side plates 104 which support a single lower roller 105 and a pair of upper rollers 106 and 107. The lower roller 105 is the driving roller for the conveyor 103. The upper roller 106 is spring mounted by tension devices 108 which preserve the desired tension in the conveyor belt 110. Belt 110 is provided with spaced transverse bars 111 which extend across the belt 110 and provide the necessary backing to allow tomatoes to be carried on the upper flight of the elevating conveyor 103. The two side plates 104 are supported by the rearward extending brace 50 at the right side of the tractor. A vertical angle iron 108 is fixed between the right longitudinal channel 43 and the brace 50 and extends upward to the rear side plate 104. A similar vertical brace 112 extends to the front side plate 104.

At the discharge end of the elevating conveyor 103 is a cleaning conveyor 113. This conveyor 113 extends rearwardly and downwardly from the upper end of elevating conveyor 103. It has a rectangular frame, noted as 114, which rotatably supports a lower transverse shaft 115 and an upper transverse shaft 116. Shaft 116 is spring biased by spring devices 117 to maintain tension in the cleaning belt 118, which is entrained about the rollers 115 and 116. The rectangular frame 114 supports suitable vertical side plates 119 and enlarged side plates 120 directly at the rear of the elevating conveyor 104. The belt 118 has a friction surface thereon adapted to clean tomatoes by motion of the belt relative to the tomatoes.

The cleaning conveyor 113 delivers tomatoes to the sorting and handling apparatus which is generally designated by the numeral 121. Since the details of the box handling apparatus are not critical to the overall scheme of the harvesting machine, this apparatus will not be further explained, except to say that the tomatoes are delivered to a horizontal transverse belt 122 which provides a working table for a pair of sorters to place the tomatoes in lug boxes.

Power Drive Assemblies

The driving assemblies for this harvesting machine are driven by the power take off shaft 123 located at the rear end of the tractor. Fixed to the shaft 123 is a driving sprocket 124 which has entrained about it a link chain 125. The chain 125 extends to a sprocket 126 which is fixed to a longitudinal shaft 127 supported by suitable bearing blocks 128 fixed to the fixed frame members. The shaft 127 extends below the rear axles 42 and is terminated at a universal joint 130 which is drivingly connected to a gear box 131. The gear box 131 has an output shaft 131a at right angles to the shaft 127. At one end of the shaft 131a is fixed a universal joint 130a which connects to a shaft 132 and a second universal joint 133. This second universal joint 133 is connected to drive shaft 71 and operates the separately assembly 53.

The remaining end of the shaft 131a has fixed thereon a sprocket 134, which drives the chain 135, and another sprocket 136 fixed to a rotatably supported shaft 137 bearingly mounted between two longitudinal channels 43 adjacent the cross member 44. The shaft 137 is quite long and provides suitable leverage to withstand the whiplashing action exerted upon it. The left end of shaft 137 has fixed thereon a universal joint 138 which carries a square shaft 140. Shaft 140 slidably receives a telescoping square shaft 141 which has a universal joint 142 at its left end. This universal joint 142 is fixed to a cross shaft 143 rotatably mounted between longitudinal members 13 in the fruit conveyor assembly 10.

Cross shaft 143 has fixed to its left end, a sprocket 144, which drives a short endless link chain 145. The link chain 145 extends along the length of left hand member 13 a short distance and is entrained around a similar sprocket 146. Intermediate the sprocket 144 and 146 chain 145 passes over an enlarged sprocket 147 fixed to shaft 148, on which is also fixed the previously described sprocket 30, which rotatably drives the harvesting reel assembly 12. The sprocket 146 is mounted on a shaft 150, on which is also mounted a similar sprocket 151. Sprocket 151 drives a chain 152 which extends downward along the member 13 to the driving sprocket 153 fixed co-axially with respect to the driving roller of the fruit conveyor 14. At the right end of shaft 150 adjacent to the opposite longitudinal member is mounted the eccentric bearing 21 which reciprocates the movable blades 17 in the cutter bar assembly 11.

The fruit conveyor 83 is driven through the drive shaft 71 by means of a sprocket 154 fixed at its left hand end. Sprocket 154 drives a link chain 155 which extends along the left beam 33 and is entrained about a similar sprocket 156 fixed to the axial shaft which mounts the rear roller 86 that in turn carries belt 84.

The belt 93 of cross conveyor 92 is driven by means of a sprocket 157 which is fixed to the rear end of the longitudinal driving shaft 127. Sprocket 157 drives a chain 158 which is entrained about a sprocket 160 fixed to the front end of roller 95, which drives the belt 93. At the opposite end of roller 95 is fixed another sprocket 161, which drives a short chain 162 which in turn drives a sprocket 163 fixed with respect to the lower roller 105 of elevating conveyor 103. Also mounted on the shaft of roller 95 is a pulley 164 which drives a pulley 165 rotatably journalled by a vertical brace 166. The pulley 165 is used to operate the box handling apparatus described in my co-pending application. The sprocket 163 drives the elevating conveyor 103. At the upper end of elevating conveyor 103 a pulley 167 is fixed with respect to the roller 107 at the rear end thereof. This pulley 167 drives an idler pulley 168 mounted on the intermediate cross shaft 170 carried directly below the cleaning conveyor 113 on rectangular frame 114. Shaft 170 also has mounted thereon another pulley 172 which drives a lower roller 115 of cleaning conveyor 113 by means of a belt 173. This completes the description of the driving mechanism for the harvester.

As noted before, the fruit conveyor assembly 10 which also carries the cutter bar assembly 11 and the harvesting assembly reel 12 is to be utilized to cut the tomato vines slightly below ground level. Since this entire assembly must be raised for travel there must be a manual means of lifting this assembly. In order to facilitate this manual lifting and also the automatic rocking action of the assembly as previously described suitable counterbalance springs 174 are mounted on the assembly between the rear vertical links 35 which support the back end of beams 13 and the vertical braces 82 at the rear end of the fruit separator assembly 53. Counterweight springs 174 are provided with suitable extension adjustments 175 so as to properly balance the offset weight of the reel assembly 12 and the bar assembly 11. The manual lifting of assembly 10 is controlled by a manual lever 176 located on the tractor seat 40 adjacent the tractor seat 40. This lever 176 is pivotally mounted on the left longitudinal diagonal brace 48 and has pivoted at its end a connecting link 177 which is generally in a horizontal position. The link 177 is pivotally connected to a short crank arm 178 which is fixed to a shaft 180. Shaft 180 extends across to a bearing bracket 181 fixed to the front transverse channel 51 adjacent the right hand beam 33. Adjacent to this bracket 181 is a similar crank arm 182 which is fixed to the shaft 180. Crank arm 182 is pivotally joined to a connecting link 183 which is pivoted to the intermediate portion of the right hand vertical supporting link 35 of the trapezoidal support for the conveyor assembly 10. Thus the tractor operator in seat 40 can easily adjust the elevation of the fruit conveyor assembly 10 by manipulation of lever 176.

Operation of the Harvester

The general operation of the harvesting machine is quite simple and should be somewhat evident from the previous description. The tractor 36 is driven along the rows of tomatoes with its left hand rear wheel directly adjacent the row to be harvested. The operator, desiring to harvest the tomatoes, lowers the conveyor assembly 10 by use of the lever 176. The assembly 10 is lowered vertically until the guides 22 rest in the furrows between the row being harvested and the adjacent rows in the field. This will locate the blades 16 and 17 slightly below the ground surface at the roots of the vines being harvested. The cutter bar assembly 10 will cut the vines below the ground surface and at the same time the harvesting reel assembly 12 will feed the vines and tomatoes over the rods 23, and onto the fruit conveyor 14. The vines and tomatoes intact on the vines will be carried upwardly on the fruit conveyor 14 and will fall at its upper end onto the fruit separator assembly 53. The chains 64 are preferably covered with rubber strips 185 which have apertures therein to allow lugs 65 to project through them. The strips 185 protect the vines from entangling within the chains 64. The vines will be held securely by the lugs 65 which are staggered between the chains 64.

As the vines and tomatoes are carried rearwardly along the chains 64 they are oscillated vigorously by the eccentric crank 73 and the associated connecting arms which move the legs 54 and 55 of the parallelogram frame. This oscillation will result in the tomatoes being shaken from the vines and being allowed to fall freely between the spaces separating chains 64. The tomatoes will fall upon the belt 84 of the horizontal conveyor 83 and will be carried rearwardly along the horizontal belt. Belt 84 directs the fruit to the cross conveyor 92. At the same time the vines on the chains 64 travel to the rear of the machine and fall from the lugs 54 as they reach the rear of the machine. These vines fall on the ground and can be turned under or windrowed as desired.

The tomatoes on the belt 93 of cross conveyor 92 are directed to be transverse elevating conveyor 103 which lifts them to the right hand side of the tractor. The tomatoes are then dropped onto cleaning conveyor 113 which extends downwardly and rearwardly from the top elevating conveyor 103. Cleaning conveyor 113 has a roughened surface and is moved in an upward direction along its upper flight. Thus the movement of the cleaning conveyor 113 is contrary to the gravitational movement imparted to the tomatoes. The tomatoes will roll downward along the conveyor 113, but the relative movement between the conveyor and the tomatoes will remove any dirt or foreign particles which are on the tomatoes. The tomatoes will then be dropped onto the belt 122 and are sorted and boxed by the sorters on the box handling apparatus 121. Thus a complete harvesting operation is provided which harvests both the vines and tomatoes at the front end of the machine and boxes the cleaned tomatoes at the rear end of the machine. The entire apparatus is mobile and can be mounted on any conventional farm tractor.

Since the front end of the fruit conveyor assembly 10 is quite free to move in transverse direction due to the forward extension of the beams 33, it has been found necessary to provide a stabilizing bar 186 which is connected about a free swivel pivot 187 fixed on the lower front end of the right hand longitudinal channel 43 of the rigid frame. The opposite end of this stabilizer 186 is pivotally mounted to the right hand longitudinal member 13 of the conveyor assembly 10 by a similar free pivot 187. The bar 186 can freely move in a vertical direction and extends directly behind the front wheels 37 of tractor 36. The bar 186 provides positive control of the lateral position of the cutter bar assembly 11.

Various modifications may be evident to one skilled in this field after a review of the foregoing description. The basic interrelation of the harvester parts should be maintained. However, minor improvements or changes can be made in the individual components without deviating from the scope of this invention. Therefore only the following claims are intended to limit and define my invention.

Having thus described my invention, I claim:

1. A tomato harvester, comprising:
   a rigid supporting framework;
   a transverse cutter bar assembly mounted at the forward end of said framework;
   separator means mounted on said framework, including laterally spaced longitudinal chain conveyors having upper and lower flights supported by a parallelogram frame having a base secured to said framework;
   oscillating means mounted on said framework operatively connected to said parallelogram frame adapted to oscillate the upper flights of said chain conveyors in its longitudinal direction;
   delivery means mounted on said framework extending below the upper flights of said chain conveyors;
   and conveyor means mounted on said framework extending from the rear edge of said cutter bar assembly to a location above the upper flights of said chain conveyors.

2. The harvester as defined in claim 1 wherein said chain conveyors are rotatably mounted on four transverse shafts carried at the pivoted joints of said parallelogram frame;
   and further comprising drive means on said framework operatively connected to said chain conveyors adapted to continuously move said chain conveyors in one direction about their positions as defined by said four transverse shafts.

3. A tomato harvester, comprising:
   a rigid supporting framework carried by ground engaging wheels and including a vertically adjustable front section;
   a cutter bar assembly mounted in a transverse position at the forward end of said front section;
   endless conveyor means mounted on said front section and extending rearwardly from a location rearwardly adjacent said cutter bar assembly to an elevated discharge position;
   manually operable means mounted on said framework operatively connected to said front section adapted to selectively vary the elevation of said cutter bar assembly with respect to the ground;
   separator means mounted on said framework, including a plurality of parallel transversely spaced oscillating endless chain conveyors extending under the discharge position of said endless conveyor means, and delivery means mounted on said framework directly below said chain conveyors.

4. A tomato harvester, comprising:
   a rigid supporting framework adapted to be fixed to a tractor frame, said framework including an adjustable front section adapted to extend longitudinally forward adjacent one side of the tractor, said front section being supported on said framework by a trapezoidal linkage adapted to move the front section upward in response to a rearward force exerted upon it;
   spring means connecting said framework and said front section adapted to counterbalance the weight of said front section;
   a cutter bar assembly mounted transversely across the forward end of said front section adapted to operate below ground level;
   transverse reel means rotatably mounted on said front section directly above said cutter bar assembly;
   endless conveyor means mounted on said front section having an upper flight extending longitudinally from the cutter bar assembly to a discharge area above and rearward of the cutter bar assembly;
   drive means on said front section adapted to transmit rotational movement to said reel means and said conveyor means and to transmit reciprocal movement to said cutter bar assembly;
   means mounted on said framework operatively connected to said front section adapted to vary the elevation of the front section as carried by said trapezoidal linkage;
   and separator means mounted on said framework including oscillating endless open conveyor means extending directly below the discharge area of said endless conveyor means, and further including delivery means located on said framework directly below said open conveyor means.

5. The harvester as defined in claim 4 wherein said delivery means includes an elevating conveyor mounted on said framework extending upwardly from said separator means;
   a downwardly extending conveyor located at the upper delivery end of said elevating conveyor in said framework adapted to receive articles therefrom, said last named conveyor having a roughened outside surface;
   and drive means on said framework operatively connected to said last-named conveyor adapted to move its upper flight in an upward direction counter to the motion of articles thereon.

6. In a tomato harvester having a rigid mobile framework and harvesting means on said framework adapted to cut a row of tomato vines at its base and to carry the vines and tomatoes thereon to a discharge area, a separator apparatus comprising:
   a parallelogram frame extending under said discharge area having two pairs of legs in vertical planes pivoted at their lower ends to said framework for pivotal movement about a pair of spaced parallel axes, a pair of longitudinal braces pivotally connected to the upper end of corresponding legs in each of said pairs of legs, and shaft means rotatably mounted by said legs coaxially with their pivotal joints for rotation about the upper and lower pivotal axes of each of said pairs of legs;

eccentric means rotatably mounted on said framework for rotation about a horizontal axis and being operatively connected to said parallelogram frame adapted to effect pivotal movement of said pairs of legs about their pivotal connections to said framework;

a plurality of parallel spaced endless conveyors supported upon said shaft means for movement about a locus defined by said shaft means, said conveyors having outwardly fixed thereon projecting abutments adapted to entangle vines carried by the conveyors;

drive means on said frame operatively connected to said conveyors adapted to move them in unison about the locus defined by said shaft means;

and delivery means mounted on said frame vertically below the upper flights of said endless conveyors adapted to receive and carry tomatoes shaken from the conveyors by the action of said eccentric means.

7. The device as defined in claim 6 wherein said delivery means comprises a first endless belt conveyor extending longitudinally parallel to said spaced endless conveyors and positioned intermediate the upper and lower flights of said spaced endless conveyors;

a second belt conveyor perpendicular to said first belt conveyor and positioned on said frame in communication with the discharge end of said first belt conveyor, said second belt conveyor extending between the upper and lower flights of said spaced endless conveyors;

and drive means on said frame operatively connected to said first and second belt conveyors.

References Cited in the file of this patent

UNITED STATES PATENTS

| | | |
|---|---|---|
| 2,226,563 | Keith | Dec. 31, 1940 |
| 2,588,764 | Richmond | Mar. 11, 1952 |

FOREIGN PATENTS

| | | |
|---|---|---|
| 1,072,422 | Germany | Dec. 31, 1959 |